(12) United States Patent
Nagase (10) Patent No.: US 10,493,548 B2
(45) Date of Patent: Dec. 3, 2019

(54) FINE HOLE ELECTRICAL DISCHARGE MACHINE

(71) Applicant: MAKINO MILLING MACHINE CO., LTD., Tokyo (JP)

(72) Inventor: Tomohiro Nagase, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 29 days.

(21) Appl. No.: 15/562,281

(22) PCT Filed: Mar. 31, 2015

(86) PCT No.: PCT/JP2015/060187
§ 371 (c)(1),
(2) Date: Sep. 27, 2017

(87) PCT Pub. No.: WO2016/157431
PCT Pub. Date: Oct. 6, 2016

(65) Prior Publication Data
US 2018/0050402 A1 Feb. 22, 2018

(51) Int. Cl.
*B23H 7/26* (2006.01)
*B23H 7/30* (2006.01)
(Continued)

(52) U.S. Cl.
CPC ............... *B23H 3/04* (2013.01); *B23H 1/08* (2013.01); *B23H 7/26* (2013.01); *B23H 7/265* (2013.01);
(Continued)

(58) Field of Classification Search
CPC ..................................................... B23H 7/26
See application file for complete search history.

(56) References Cited

U.S. PATENT DOCUMENTS

| 2009/0134136 A1 | 5/2009 | Graichen | |
|---|---|---|---|
| 2012/0132623 A1* | 5/2012 | Justice, Jr. | ............. B23H 7/265 219/69.15 |

FOREIGN PATENT DOCUMENTS

| CN | 102950342 | 3/2013 |
|---|---|---|
| CN | 103249514 | 8/2013 |

(Continued)

OTHER PUBLICATIONS

Machine translation of JP 08-108322 of Fujii et al. (Year: 1996).*
(Continued)

*Primary Examiner* — Brian W Cohen
(74) *Attorney, Agent, or Firm* — Morrison & Foerster LLP (57) ABSTRACT

This fine hole electrical discharge machine applies voltage between a fine hole machining electrode and a workpiece to cause discharge, and machines a fine hole in the workpiece by using energy of the discharge. The fine hole electrical discharge machine comprises: a bendable guide tube having a hollow portion through which the electrode is inserted; and a tube holder that supports the leading end of the guide tube and allows the leading end of the guide tube to be inclined at a desired angle. Thus, even when the workpiece has a complicated shape, like a blisk, having a large number of turbine blades arranged in the circumferential direction, a fine hole can be machined by accurately positioning the electrode so as to orient the electrode toward a target machining point on a surface of the workpiece without involving interference with the workpiece.

3 Claims, 8 Drawing Sheets

(51) Int. Cl.
*B23H 9/14* (2006.01)
*B23H 3/04* (2006.01)
*B23H 1/08* (2006.01)
*B23H 7/28* (2006.01)

(52) U.S. Cl.
CPC ............... *B23H 7/30* (2013.01); *B23H 9/14* (2013.01); *B23H 7/28* (2013.01)

(56) References Cited

FOREIGN PATENT DOCUMENTS

| | | |
|---|---|---|
| CN | 103551686 | 2/2014 |
| JP | 50-140992 | 11/1975 |
| JP | 2-116428 A | 5/1990 |
| JP | 2-243223 A | 9/1990 |
| JP | 7-1246 | 1/1995 |
| JP | 08108322 A * | 4/1996 |
| JP | 2006-175568 | 7/2006 |
| JP | 2008-302459 | 12/2008 |
| JP | 2013-544195 | 12/2013 |
| WO | 2012074897 | 6/2012 |
| WO | WO-2012/074897 | 6/2012 |

OTHER PUBLICATIONS

International Search Report dated Jun. 30, 2015, directed to PCT Application No. PCT/JP2015/060187; 2 pages.

* cited by examiner

FINE HOLE ELECTRICAL DISCHARGE MACHINE

CROSS-REFERENCE TO RELATED APPLICATION

This application is a U.S. National Stage Application of International Patent Application No. PCT/JP2015/060187, filed on Mar. 31, 2015, which is hereby incorporated by reference in the present disclosure in its entirety.

FIELD OF THE INVENTION

The present invention relates to a fine hole electrical discharge machine that machines a small-diameter hole (a fine hole) in a workpiece by using a hollow pipe electrode.

BACKGROUND OF THE INVENTION

A typical example of fine-hole machining is a case when cooling holes for flowing cooling air that cools the surface of a turbine blade are formed on the surface thereof. For example, Patent Literature 1 discloses an electrode holder of an electrical discharge machine that machines a fine hole on the surface of a turbine blade. In the electrode holder, a replaceable tubular guide is provided to penetrate the electrode holder, and a pipe electrode is inserted into the guide. The electrode holder allows for selective mounting of a guide having a straight distal end portion or a guide having a bent distal end portion so as to conform to the shape of a workpiece.

PATENT PUBLICATIONS

Patent Literature 1: WO2012/074897

BRIEF SUMMARY OF THE INVENTION

In the invention of Patent Literature 1, when mounting the guide to the electrode holder, the distal end thereof cannot be accurately positioned with respect to the electrode holder. Thus, when machining a fine hole in a workpiece that requires precise machining, such as a turbine blade, the electrode cannot be accurately arranged toward a machining point on the surface of the workpiece by using a feeding device of the electrical discharge machine. Additionally, in order to insert the electrode into the guide, it is necessary to circulate a high pressure lubricant through the guide, separately from a machining fluid. Furthermore, the electrode holder of Patent Literature 1 requires manual replacement of the electrode holder in such a case as when machining fine holes having different diameters in a single workpiece.

The technical object of the invention is to solve such problems of the conventional art, and it is an object of the invention to provide a fine hole electrical discharge machine that machines a fine hole in a workpiece by guiding an electrode with high precision to a machining point not located on a rotational axis of a spindle that rotates the electrode.

In order to achieve the above object, the invention provides a fine hole electrical discharge machine for machining a fine hole in a workpiece with the energy of electrical discharge generated by applying a voltage between an electrode for machining fine holes and the workpiece, comprising a bendable guide tube having a hollow portion through which the electrode is inserted, and a tube holder, for supporting a distal end of the guide tube, and inclining the distal end of the guide tube at a desired angle.

According to the invention, even when a workpiece has a complicated shape, like a blisk, where a large number of turbine blades are circumferentially arranged, the electrode is accurately positioned toward a target machining point on a surface of the workpiece without interfering with the workpiece, thereby enabling a fine hole to be machined, as compared with conventional art.

DETAILED DESCRIPTION OF THE INVENTION

With reference to FIGS. 1 to 8, an embodiment of the invention will be described below.

Figure 1:
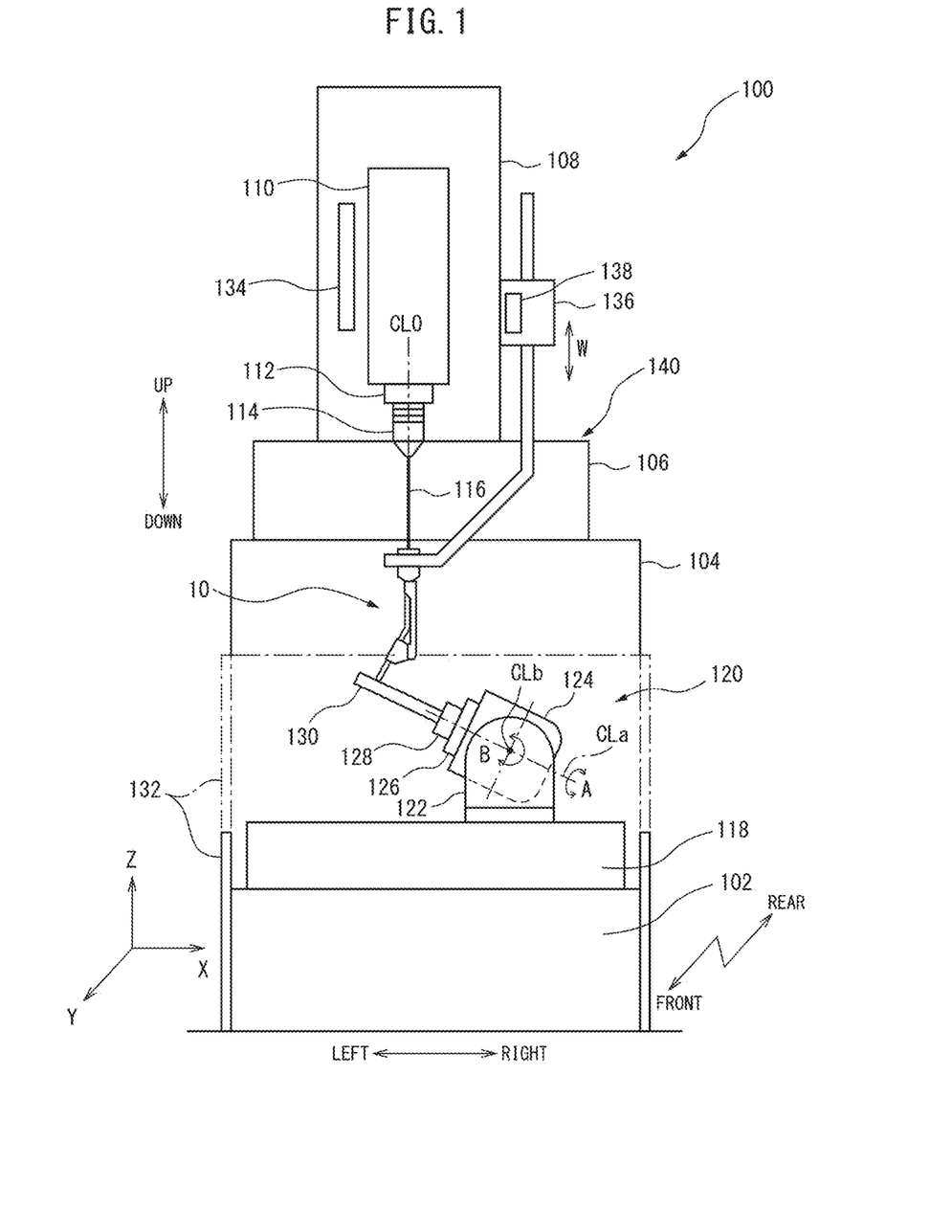
FIG. 1 is a front view schematically illustrating a structure of a main part of an electrical discharge machine according to a preferable embodiment of the invention.

FIG. 1 is a front view schematically illustrating the structure of a main part of an electrical discharge machine 100 to which the invention is applied. It is noted that, hereinafter, for convenience, three orthogonal axis directions (X-axis direction, Y-axis direction, and Z-axis direction) are defined as the right-left direction, the front-rear direction, and the up-down direction, respectively, as illustrated, and a structure of each part will be described according to the definition.

In FIG. 1, a column 104 is disposed upright on a rear part of a bed 102 providing a base. On an upper surface of the column 104, an X-slider 106 is supported movably in the X-axis direction (the right-left direction). On an upper surface of the X-slider 106, a ram 108 is supported movably in the Y-axis direction (the front-rear direction, which is a direction perpendicular to the plane of the drawing). On a front surface of the ram 108, a spindle head 110 is supported movably in the Z-axis direction (the up-down direction). A rotating spindle 112 is supported by the spindle head 110 rotatably around an axis CL0. An electrode holder 114 is mounted to a distal end of the rotating spindle 112 extending from a bottom surface of the spindle head 110.

A W-axis guide assembly 140 is mounted to a side surface of the ram 108. The W-axis guide assembly 140 includes a guide arm 142 supported movably in the up-down direction by a bracket 136 provided on a right side surface of the ram 108. An up and down moving axis of the guide arm 142 is defined as W-axis. The W-axis is parallel to the Z-axis. A lower end portion 142a of the guide arm 142 is inclined obliquely inward with respect to the W-axis or the Z-axis, and a W-axis chuck 144 is provided at a distal end of the lower end portion 142a. The W-axis chuck 144 holds an inclined electrode guide 10. More particularly, the inclined electrode guide 10 is held at the distal end of the guide arm 142 by the W-axis chuck 144 so that the center of an upper end of the guide is aligned with the axis CL0.

Between the electrode holder 114 and the inclined electrode guide 10, an electrode 116 is extended along the axis CL0. The electrode 116 is a cylindrical pipe electrode of which upper end is held by the electrode holder 114. As indicated by an arrow $A_E$ in FIG. 5, when the rotating spindle 112 rotates around the axis CL0, the electrode 116 rotates around the axis CL0 together with the electrode holder 114. A lower end of the electrode 116 is bent to be inclined with respect to the axis CL0 by the inclined electrode guide 10. A machining fluid, e.g., water, is supplied into the electrode 116, and then is discharged from a distal end (the lower end) of the electrode 116. It is noted that an oil may be used as the machining fluid. by the inclined electrode guide 10. A machining fluid, e.g., water, is supplied into the electrode 116, and then is discharged from a distal end (the lower end) of the electrode 116. It is noted that an oil may be used as the machining fluid.

On an upper surface of the bed 102, a table 118 is arranged in front of the column 104. An inclined rotary table device 120 is mounted on an upper surface of the table 118. The inclined rotary table device 120 includes a pair of front and rear support members 122 projected upward from the upper surface of the table 118, an inclined member 124 supported, between the front and rear support members 122, pivotably in a B-axis direction around a pivot axis CLb extending in the Y-axis direction, and a rotary table 126 supported, on a left end surface of the inclined member 124, rotatably in an A-axis direction around a rotational axis CLa perpendicular to the pivot axis CLb. The rotary table 126 is provided with a chuck 128 to which a workpiece 130 is mounted. The workpiece 130 is, e.g., a turbine blade or vane for use in a gas turbine. Since turbine blades are exposed to a high temperature gas of approximately from 1000 to 1500° C., a highly heat-resistant nickel alloy is used as a constituent material therefor. Machined on surfaces of such turbine blades are cooling holes for flowing cooling air for cooling the surfaces thereof.

Around the table 118, a machining tank 132 is provided in a vertically movable manner so as to enclose an entirety of the table 118 and the inclined rotary table device 120. It is noted that a dashed line of FIG. 1 indicates a machining state in which the machining tank 132 has ascended. In a non-machining state, such as a set-up operation state, the machining tank 132 descends, as indicated by a solid line.

Although not illustrated, the electrical discharge machine 100 of FIG. 1 includes an X-axis driving unit that moves the X-slider 106 in the right-left direction, a Y-axis driving unit that moves the ram 108 in the front-rear direction, a Z-axis driving unit that moves the spindle head 110 in the up-down direction, a spindle driving unit that rotates the rotating spindle 112 around the axis CL0, a W-axis driving unit that moves the guide arm 142 in the up-down direction, a B-axis driving unit that inclines the inclined member 124 around the pivot axis CLb, and an A-axis driving unit that rotates the rotary table 126 around the rotational axis CLa. Each of the X-axis driving unit, the Y-axis driving unit, the Z-axis driving unit, and the W-axis driving unit are formed by, e.g., a ball screw and a servo motor that rotationally drives the ball screw; the spindle driving unit is formed by, e.g., a spindle motor; and each of the B-axis driving unit and the A-axis driving unit are formed by, e.g., a DD (direct drive) servo motor. The X-axis driving unit, the Y-axis driving unit, the Z-axis driving unit, the W-axis driving unit, the spindle driving unit, the B-axis driving unit, and the A-axis driving unit are controlled by an NC device (not illustrated) of the electrical discharge machine 100.

The structure described above allows the electrode holder 114 and the inclined electrode guide 10 to move relatively to the workpiece 130 in the X-axis direction, the Y-axis direction, and the Z-axis direction, and also to move in the B-axis direction and the A-axis direction. Accordingly, the workpiece 130 can be machined into a desired three-dimensional shape. Additionally, vertical movement of the guide arm 142 by the W-axis driving unit allows the gap between the electrode holder 114 and the inclined electrode guide 10 to be adjusted, whereby the upper and lower ends of the electrode 116 can be constantly supported by the electrode holder 114 and the inclined electrode guide 10 during machining regardless of changes in length of the electrode 116 due to the wear of the electrode 116.

Provided on the front surface of the ram 108 is a position detector 134, such as linear scale, for detecting a Z-axis position in the up-down direction of the spindle head 110. The position of the electrode holder 114, i.e., the position of the upper end of the electrode 116 is detected by the signals from the position detector 134. Provided on the bracket 136 of the guide arm 142 is a position detector 138, such as a linear scale, for detecting the W-axis position of the guide arm 142 in the up-down direction with respect to the ram 108. Since the shape of the guide arm 142 is known in advance, the position of the W-axis chuck 144 can be measured based on the values from X-axis and Y-axis position detectors and the W-axis position detector 138.

It is noted that although not illustrated, an electrode magazine is provided on a side part of the W-axis guide assembly 140. The electrode magazine holds a plurality of electrodes 116 having an initial length L0 (previously known) for replacement, and the electrodes 116 can be changed between the rotating spindle 112 and a tool magazine by using a not-illustrated changing means. Furthermore, the electrical discharge machine 100 can be provided with a guide magazine (not illustrated) for storing a plurality of inclined electrode guides 10.

Figure 2:
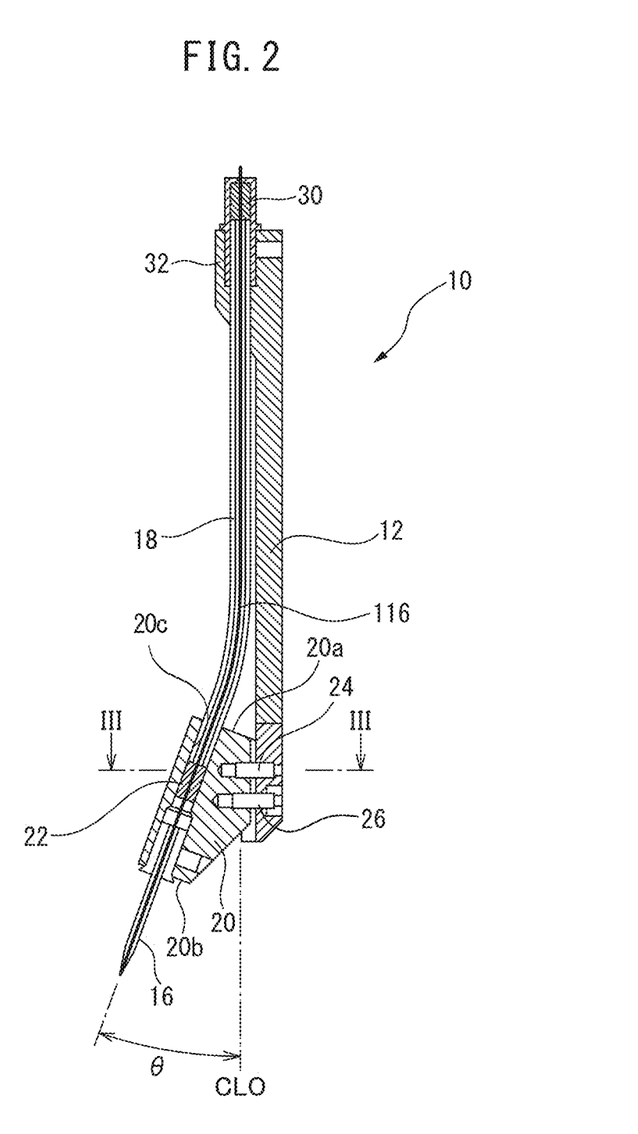
FIG. 2 is a schematically illustrated cross-sectional view of an inclined electrode guide according to a preferable embodiment of the invention.

Referring to FIG. 2, the inclined electrode guide 10 is provided with a main body 12 in the form of a linearly extending rod member, a flexible resinous guide tube 18 mounted to one side surface of the main body 12, a coupling portion 30 mounted to a proximal end portion or an upper end portion of the guide tube 18, a proximal end-side tube holder 32 for attaching the coupling portion 30 to the main body 12, an inclined tube holder 20 for attaching a distal end of the guide tube 18 to the main body 12, a positioning guide 16 mounted to the inclined tube holder 20, and a shuttle 14 detachably engaged with the W-axis chuck 144. The guide tube 18 is a flexible resinous tubular member having a larger inner diameter than an outer diameter of the electrode 116. The W-axis chuck 144 is substantially an annular member having an opening 146, and has a plurality of engagement recesses 148 formed on an inner peripheral surface thereof.

The coupling portion 30 is composed of a hollow member, and is fixed to the proximal end or the upper end of the guide tube 18 by the proximal end-side tube holder 32 so that a hollow portion thereof is substantially coaxial with the hollow portion of the guide tube 18. The hollow portion of the coupling portion 30 is tapered so that an inlet side thereof is larger than an inner diameter of the guide tube 18 in a direction in which the electrode 116 is inserted and an outlet side thereof is substantially the same as the inner diameter of the guide tube 18.

The proximal end-side tube holder 32 is composed of a hollow member that receives the coupling portion 30 and the guide tube 18. The proximal end-side tube holder 32 can be integrally molded with the main body 12 or can be fixed, as a member discrete from the main body 12, to the main body 12 by a fixing means such as a screw.

As illustrated in FIG. 2, the coupling portion 30 is fixed into the proximal end-side tube holder 32 so as to project upward from the proximal end-side tube holder 32. A part of the coupling portion 30 projecting from the proximal end-side tube holder 32 is connected to the shuttle 14. The shuttle 14 is detachably engaged with the electrode holder 114 on an upper surface thereof. The shuttle 14 is also detachably engaged with the W-axis chuck 144 on a side surface thereof. In an example of FIG. 5, the shuttle 14 has a plurality of locking pins 15 that engage with the engagement recesses 148 formed on the inner surface of the W-axis chuck 144. By engaging the locking pins 15 with the engagement recesses 148, the inclined electrode guide 10 can be accurately positioned and fixed to the W-axis chuck 144. Particularly, by engaging the locking pins 15 with the engagement recesses 148, an orientation of the inclined electrode guide 10 is uniquely determined, so that the positioning guide 16 and the distal end of the electrode 116 can be accurately oriented.

Figure 3:
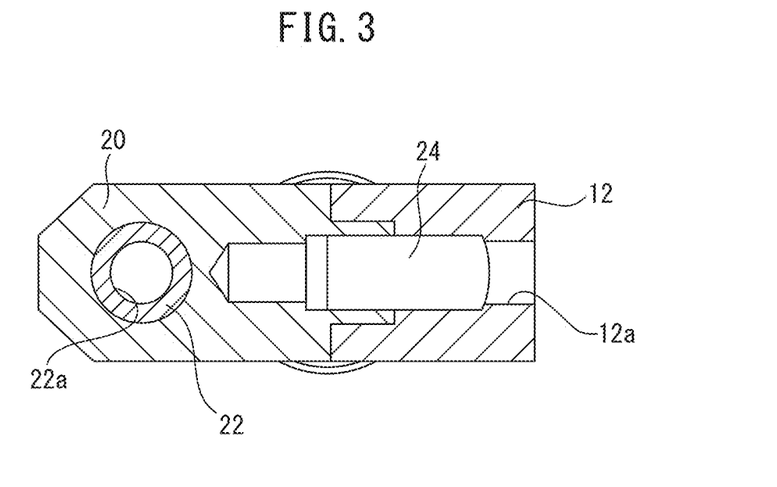
FIG. 3 is a cross-sectional view taken along an arrow line III-III of FIG. 2.

As indicated in FIG. 3, the inclined tube holder 20 is accurately positioned and fixed to the distal end of the main body 12 by a positioning pin 24 extending perpendicular to the axis CL0 and a fixing screw 26 parallel to the positioning pin 24. In addition, the inclined tube holder 20 has a passage 20c penetrating from a proximal end surface 20a thereof to a distal end surface 20b thereof. The passage 20c is extended being inclined at a predetermined angle θ with respect to the axis CL0. By preparing a plurality of inclined tube holders 20 different in the inclined angle θ and selecting an appropriate inclined tube holder 20 so as to conform to the shape of the workpiece 130, the inclined tube holder 20 is made to conform to various workpiece shapes, thereby enabling the distal end of the electrode 116 to be positioned toward a machining point on a workpiece surface.

The distal end of the guide tube 18 is inserted into the passage 20c from the proximal end surface 20a, and the positioning guide 16 is inserted into the passage 20c from the distal end surface 20b. In the passage 20c, an introducing member 22 composed of a hollow member is arranged between the guide tube 18 and the positioning guide 16. The introducing member 22 has an inner diameter tapered from an inlet thereof to an outlet thereof so as to guide the electrode 116 from the guide tube 18 to the positioning guide 16.

The positioning guide 16 that is mounted to the distal end surface of the inclined tube holder 20 is a hollow member having a slightly larger inner diameter than the electrode 116. The positioning guide 16 slidably supports an outer peripheral surface of the electrode 116 on an inner peripheral surface thereof, and accurately guides the electrode 116 toward a machining point on a surface of the workpiece 130 while restricting radial movement (deflection) of the electrode 116.

Figure 8:
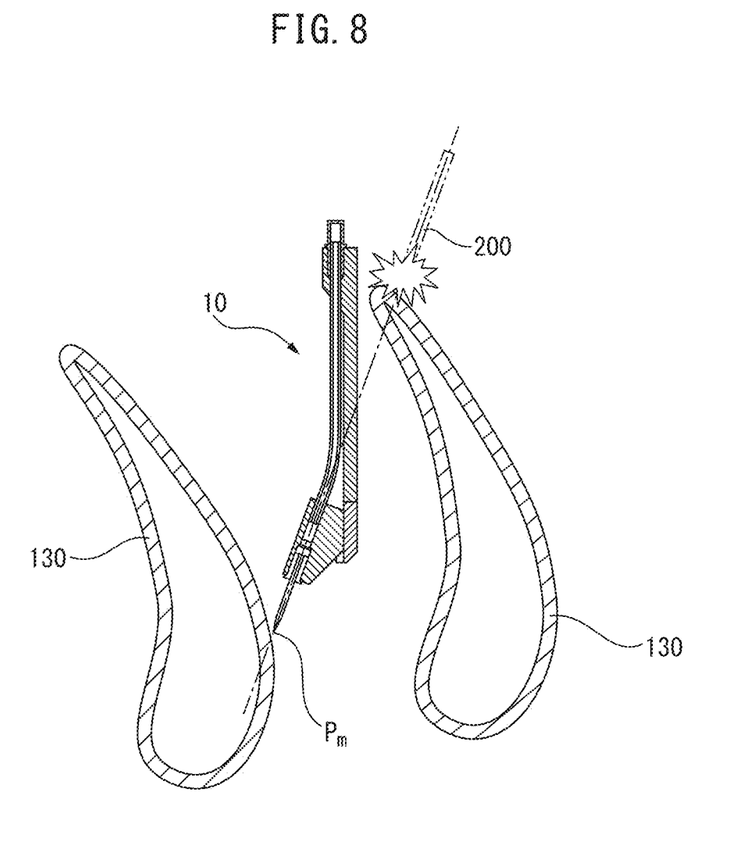
FIG. 8 is a schematic diagram for illustrating operation of the inclined electrode guide of the invention.

According to the present embodiment, when the workpiece 130 has a complicated shape, like a blisk, where a large number of turbine blades are circumferentially arranged, the electrode 116 can be accurately positioned toward a machining point Pm as a target on the surface of the workpiece 130 without interfering with the workpiece 130, as compared with a conventional technique in which the electrode 116 is extended to the workpiece 130 along the axis CL0 in the up-down direction passing through the center of the electrode holder 114 and the inclined electrode guide 10, as indicated by a two-dot chain line in FIG. 8. Then, a fine hole can be machined by relatively moving the electrode 116 and the workpiece 130. A conventional straight pipe electrode 200 without the inclined electrode guide 10 interferes with an immediately preceding blade and cannot reach the machining point Pm.

Additionally, in the present embodiment, the inlet of the guide tube 18 is provided with the coupling portion 30 having the inner diameter tapered toward the guide tube 18, and the introducing member 22 having the inner diameter tapered toward the positioning guide 16 is provided between the guide tube 18 and the positioning guide 16. Thus, it is unnecessary to circulate a high-pressure lubricant separately from a machining fluid, as in Patent Literature 1.

Figure 4:
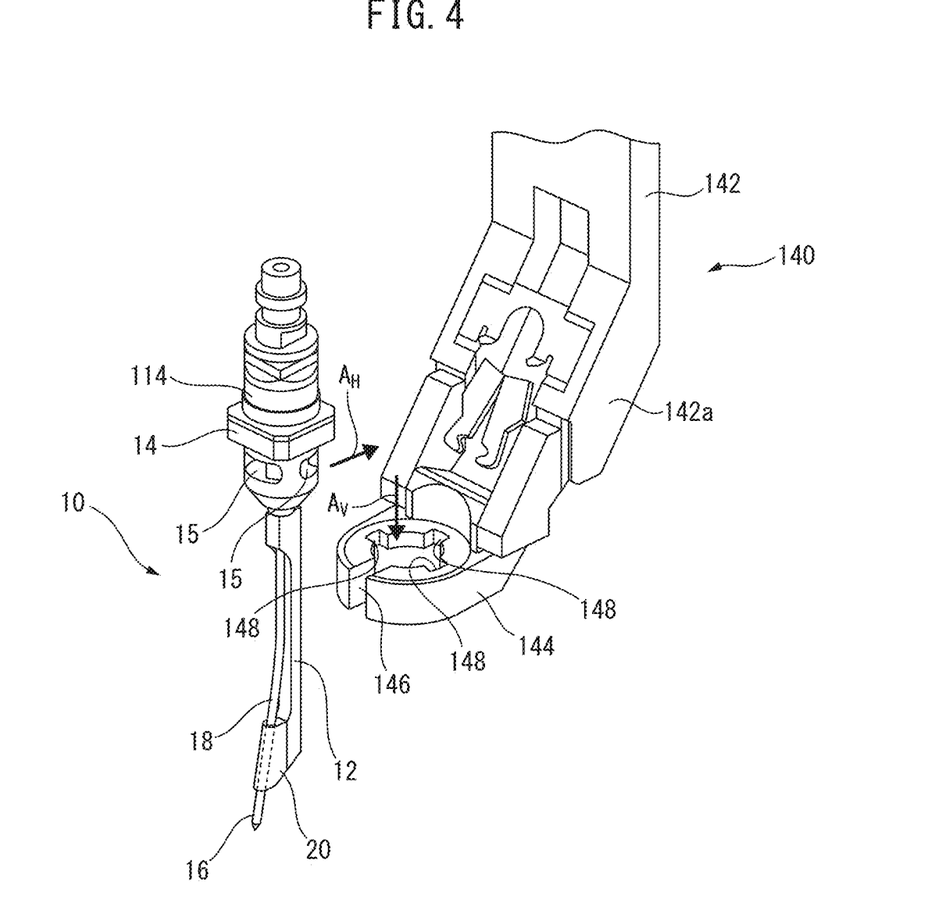
FIG. 4 is a perspective view illustrating a state in which the inclined electrode guide is being mounted to a W-axis chuck.
Figure 5:
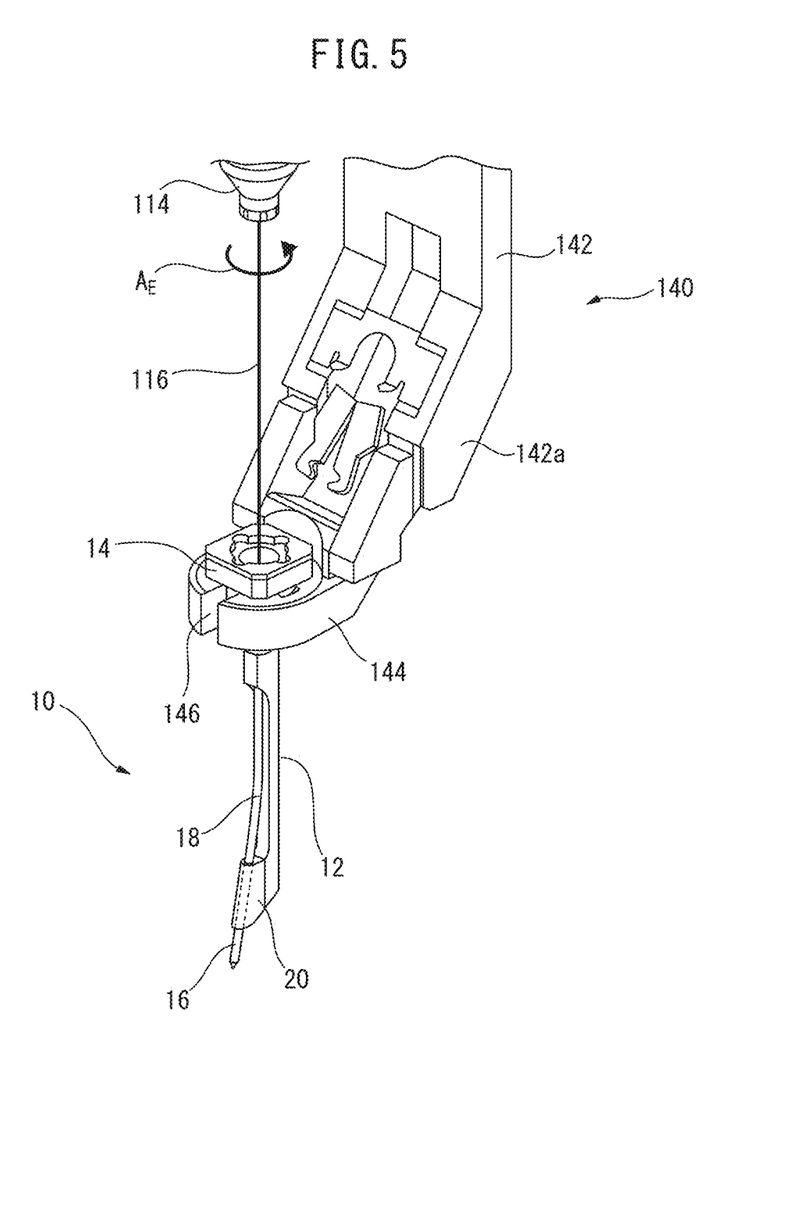
FIG. 5 is a perspective view illustrating a state in which the inclined electrode guide has been mounted to the W-axis chuck and an electrode holder has been separated.
Figure 6:
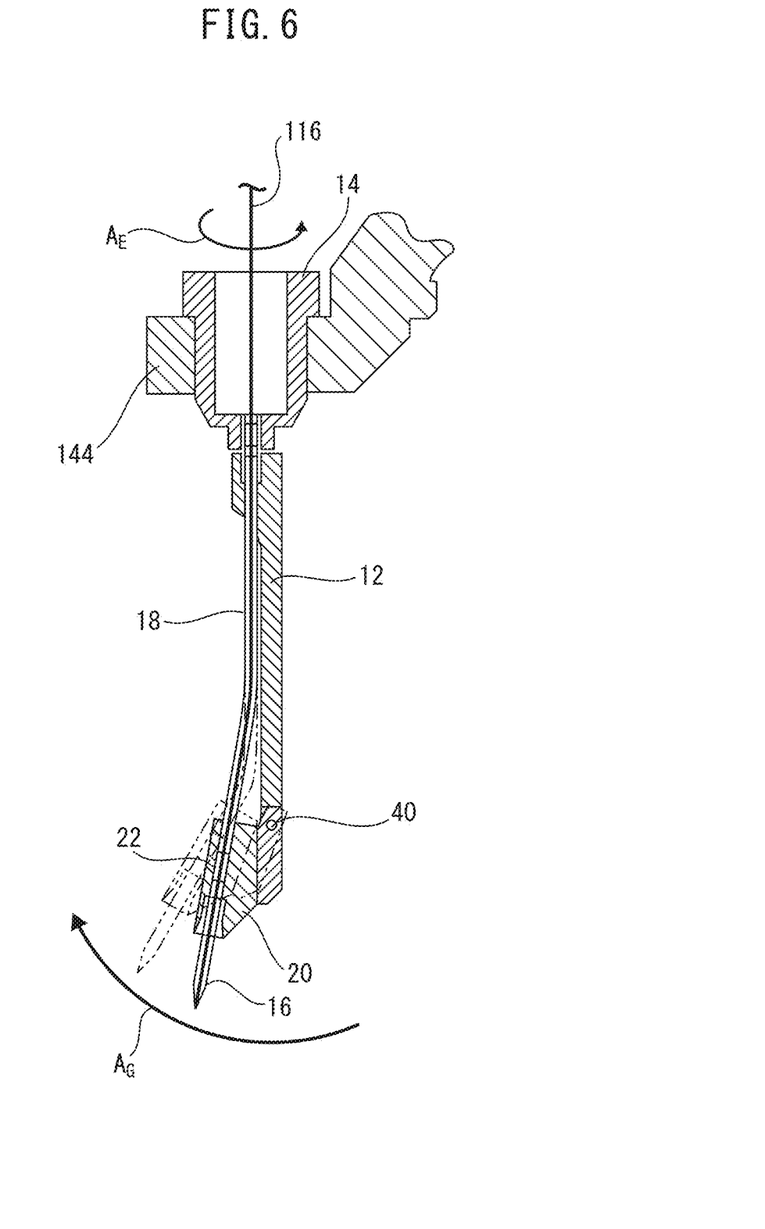
FIG. 6 is a schematically illustrated cross-sectional view illustrating a modified example of the inclined electrode guide.

In addition, storing the plurality of inclined electrode guides 10 having different inclined angles θ in the above-described guide magazine (not illustrated) enables the inclined electrode guide 10 to be automatically replaced by appropriately controlling the X-axis driving unit, the Y-axis driving unit, the Z-axis driving unit, and the W-axis driving unit of the electrical discharge machine 100. FIG. 4 is a diagram illustrating a state in which the inclined electrode guide 10 coupled to the electrode holder 114 mounted to the distal end of the rotating spindle 112 is being mounted to the W-axis chuck 144 by using the X-axis driving unit, the Y-axis driving unit, the Z-axis driving unit, and the W-axis driving unit. When mounting the inclined electrode guide 10 to the W-axis chuck 144, first, the inclined electrode guide 10 is moved in a horizontal direction, e.g., in the X-axis direction, the main body 12 is introduced in the W-axis chuck 144 through the opening 146 of the W-axis chuck 144, and next, the inclined electrode guide 10 is moved in the up-down direction to allow the shuttle 14 to be engaged with the W-axis chuck 144.

The previously-mentioned embodiment has described the example changing various angles of the distal end portion of the electrode 116 by preparing the plurality of inclined tube holders 20 having different inclined angles θ in relation to the passage 20c and selecting an inclined tube holder 20 having a desirable inclined angle θ from among them. In an example indicated in FIG. 6, the inclined tube holder 20 is mounted to the distal end of the main body 12 pivotably around a rotational axis 40 extending in a direction perpendicular to the axis CL0, as indicated by an arrow AG. This enables the angle of the distal end of the electrode 116 to be optionally changed.

Figure 7:
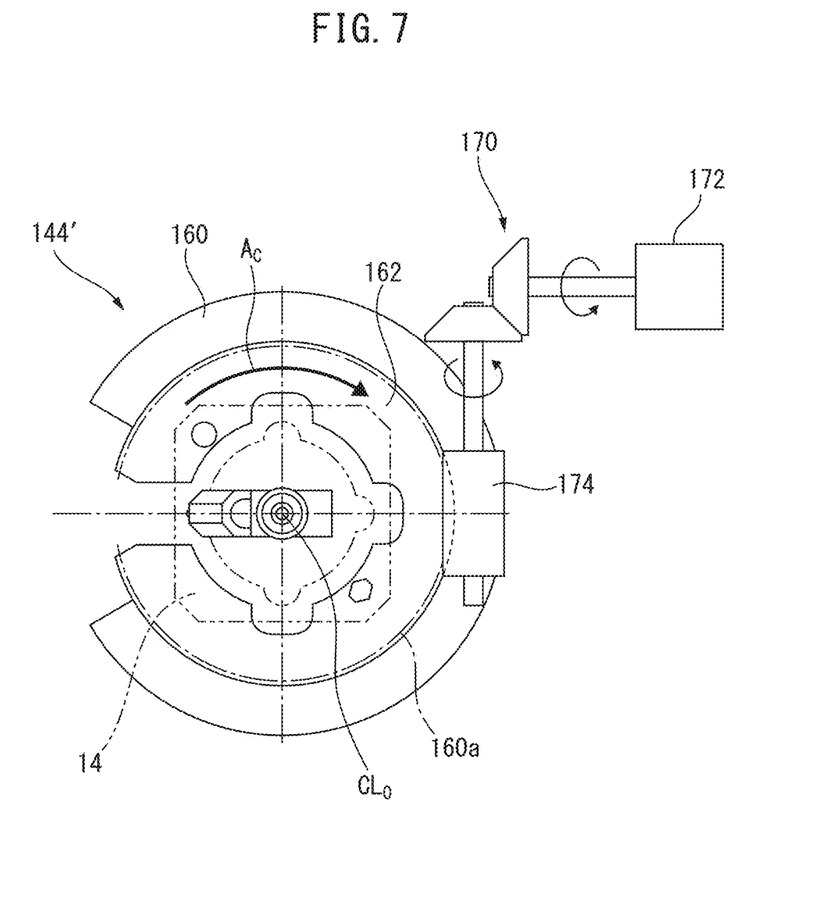
FIG. 7 is a schematically illustrated plan view illustrating a W-axis chuck of an electrical discharge machine according to another embodiment.

Furthermore, the shuttle 14 may be made rotatable around the axis CL0 with respect to the W-axis chuck. Referring to FIG. 7, a W-axis chuck 144' is provided with substantially a circular outer frame 160 and a chuck 162 mounted to the outer frame 160 rotatably around the axis CL0 and having teeth formed on an outer peripheral surface thereof. The chuck 162 is rotationally driven by a gear, e.g., a worm 174 which is driven by a drive motor 172. In the example of FIG. 7, rotating the chuck 162 around the axis CL0 as indicated by an arrow AC allows the inclined electrode guide 10 to be rotated around the axis CL0, whereby the positioning guide 16 is rotated around the axis CL0 to enable the direction of the electrode 116 to be optionally changed.

REFERENCE SIGNS LIST

10 Inclined electrode guide
12 Main Body

14 Shuttle
15 Locking Pin
16 Positioning Guide
18 Guide Tube
20 Inclined Tube Holder
22 Introducing Member
24 Pin
30 Coupling Portion
32 Proximal End-Side Tube Holder
112 Rotating Spindle
114 Electrode Holder
116 Electrode
120 Inclined Rotary Table Device
130 Workpiece
142 Guide Arm

The invention claimed is:

1. A fine hole electrical discharge machine for machining a fine hole in a workpiece with energy of electrical discharge generated by applying a voltage between an electrode, held by a rotating spindle, for machining fine holes and the workpiece, comprising:
   an inclined electrode guide for guiding a distal end of the electrode in an inclined manner relative to a rotational axis of the electrode,
   the inclined electrode guide comprising,
      a main body provided on a guide arm and extending substantially parallel to the rotational axis of the electrode,
      a bendable guide tube having flexibility and a hollow portion through which the electrode is inserted, the hollow portion having an inner diameter greater than an outer diameter of the electrode, wherein a proximal end portion of the guide tube is held substantially parallel to the rotational axis of the electrode by the main body of the inclined electrode guide, and
      a tube holder, mounted to the main body of the inclined electrode guide, for supporting a distal end portion of the guide tube so as to incline the distal end portion of the guide tube at a desired angle,
   wherein the tube holder includes a positioning guide having an inner diameter smaller than that of the guide tube, for guiding the electrode at the desired angle relative to the rotational axis of the electrode, and mounted to a distal end of the tube holder, and an introducing member having an inner diameter tapered toward the positioning guide and provided between the guide tube and the positioning guide.

2. The fine hole electrical discharge machine according to claim 1, wherein the tube holder is pivotable around an axis perpendicular to a rotational axis of the electrode, whereby the angle of a distal end of the electrode can be changed.

3. The fine hole electrical discharge machine according to claim 1, wherein the tube holder is rotatable around an axis parallel to a rotational axis of the electrode, whereby the direction of inclination of a distal end of the electrode can be changed.

* * * * *